Patented Aug. 26, 1930

1,774,040

UNITED STATES PATENT OFFICE

FRIEDRICH RÜSBERG, OF BERLIN-NIEDERSCHONEWEIDE, GERMANY, ASSIGNOR TO KALI-CHEMIE, AKTIENGESELLSCHAFT, OF BERLIN, GERMANY

CHEMICAL DECOMPOSITION OF CRUDE POTASH SALTS

No Drawing. Application filed September 4, 1929, Serial No. 390,413, and in Germany September 6, 1928.

This invention relates to the treatment of crude potash salts to separate the different constituents of said salts and has for its object so to treat the crude potash salts by a more or less chemical process, that valuable products and no or only small amounts of valueless by-products are obtained.

Crude potash salts obtained by mining especially in Germany, generally contain as predominant constituents potassium chloride, sodium chloride, magnesium sulfate and magnesium chloride in varying amounts. The usual method for working up these crude potash salts is based on fractional crystallization of solutions of these salts, thus obtaining potassium chloride as valuable product, a solid residue consisting of magnesium sulfate and potassium chloride and a solution containing the chlorides of magnesium and sodium as more or less valueless by-products.

The two most valuable fertilizing constituents of crude potash salts are the potassium present as potassium chloride and the sulfuric acid present as magnesium sulfate. Potassium sulfate is a much more valuable fertilizer than potassium chloride and it is therefore one object of the invention to combine all the sulfuric acid present as magnesium sulfate in the crude potash salt with potassium present as easily soluble potassium chloride under formation of the difficultly soluble potassium sulfate and magnesium chloride which for its great solubility compared with magnesium sulfate makes it much easier to obtain valuable products from the solutions remaining after separation of the potassium sulfate.

A further object of the invention is the manufacture of sodium carbonate from the sodium chloride present in the raw material.

A further object of the invention is the manufacture of valuable ammonium salts from ammonia and the acid constituents of the salts present in the crude potash salts.

A further object of the invention is the removal of the magnesium compounds from the solutions obtained during the treatment and the manufacture of valuable products from the magnesium compounds.

The present process for working up crude potash salts consists broadly in causing different constituents of an aqueous solution of the raw material to react with each other under formation of valuable products by the help of ammonia, which is forming other valuable products with other constituents of the raw material, or products which may be easily converted into other valuable products by further treatments.

The invention will be explained by reference to certain specific examples thereof, but it is to be clearly understood, that the invention is not limited to the particular procedure described in these examples, nor otherwise than as defined in the appended claims.

Example 1

300 kg. of a crude potash salt called hartsalz (Ullmann, Enzyklopädie der technischen Chemie, vol. 6, page 581) and containing as predominant constituents from 12 to 23% of KCl, 35 to 70% of NaCl, 10 to 48% of $MgSO_4$ and some $MgCl_2$ are dissolved by heating in 500 l. of water, to which are added 200 l. of the ammonium chloride containing mother liquor obtained at the end of the process as described below. After cooling the solution to room temperature gaseous ammonia is passed into the solution until it is saturated with ammonia, thus precipitating a salt consisting mainly of potassium sulfate and containing 76% of $K_2SO_4$, 8% of $Na_2SO_4$ and 6% of $(NH_4)_2SO_4$. The salt is separated by filtration and the mother liquor is treated at about 50° C. with carbon dioxide, thus precipitating nearly all the magnesium compounds present as magnesium-ammonium carbonate, which is separated from its mother liquor containing about 14 g. of KCl, 170 g. of NaCl and only 0,3 g. of MgO besides 4,8 g. of $SO_3$ per liter. This mother liquor is treated with ammonia and carbon dioxide for converting about 60% of the sodium chloride present in the solution into sodium bicarbonate, which precipitates and is separated from its mother liquor. The sodium bicarbonate is in the usual manner converted into sodium carbonate, whereas the mother liquor is concentrated, until it is saturated with sodium chloride. The concentrate is cooled, thereby obtaining by crystallization a salt mixture consisting of about 45% of NH$_4$Cl and 50% of KCl besides a small amount of NaCl. The ammonium chloride containing mother liquor obtained by this crystallization is used for dissolving fresh amounts of crude potash salts as described above.

Example 2

300 kg. of the magnesium-ammonium carbonate obtained according to Example 1 are introduced into 1000 liters of a saturated potassium chloride solution; the suspension obtained is treated with carbon dioxide, thus precipitating a mixture of potassium-magnesium carbonate with potassium-magnesium bicarbonate, which is separated from its mother liquor. The mixture of these carbonates is converted into potassium carbonate by the usual methods. The mother liquor is concentrated and a fertilizing salt mixture containing about 40% of NH$_4$Cl and 55% of KCl is obtained by crystallization. The mother liquor remaining after this crystallization is used for dissolving fresh amounts of crude potash salts as described above. The concentration of this mother liquor and its crystallization may be combined with the concentration and crystallization of the sodium bicarbonate mother liquor of Example 1.

Example 3

600 kg. of sylvinit (Ullmann, l. c., pages 581 and 582) are dissolved by heating in 100 liters of water and 400 liters of the ammonium chloride containing mother liquor obtained at the end of the process and described below. After cooling the solution to room temperature gaseous ammonia is passed into the solution until it is practically free from dissolved SO$_4$ ions. The precipitated potassium sulfate is removed by filtration and the solution is heated or evacuated to remove the greatest part of dissolved ammonia. Care is, however, taken that the ammonia of the solution concentration is not reduced so much, that magnesia precipitates. The solution is then cooled to a temperature below 40° C. and treated with carbon dioxide, thus precipitating nearly all the magnesium compounds as magnesium carbonate trihydrate, which is separated from its mother liquor. The mother liquor is then treated with ammonia and carbon dioxide or ammonium carbonate to convert about 65.7% of the sodium chloride present in the solution into sodium bicarbonate, which is separated and converted into sodium carbonate.

The mother liquor of the sodium bicarbonate precipitation, which contains about 105 g. of KCl, 80 g. of NaCl and 120 g. of NH$_4$Cl per liter is concentrated until it is saturated with sodium chloride and cooled. A salt mixture consisting of about 58% of NH$_4$Cl and 42% of KCl is obtained by crystallization, whereas the ammonium chloride containing mother liquor is used for dissolving fresh amounts of crude potash salts as described above. The salt mixture of potassium chloride and ammonium chloride obtained may be introduced into a saturated solution of ammonia and this mixture may be treated with gaseous ammonia, until all the ammonium chloride is dissolved, thus obtaining a solid residue of potassium chloride and an ammoniacal solution of comparatively pure ammonium chloride, which may be worked up to ammonia and ammonium chloride.

In the examples changes may be made without deviating from the scope of the invention. Thus for example other crude potash salts containing potassium chloride and magnesium sulfate may be used. It is further not necessary, to combine all the sulfuric acid of the magnesium sulfate with the potassium of the potassium chloride as a part of it may be combined with the ammonia as ammonium sulfate, which goes into the fertilizing salt mixture obtained in the process. Also ammonium sulfate or an ammonium sulfate containing mother liquor may be used for dissolving the crude potash sulfate, as ammonium sulfate just as ammonium chloride prevents the precipitation of magnesium compounds during the first ammonia treatment of the salt solution for precipitating potassium sulfate.

I claim:

1. A method for making valuable products from magnesium sulfate and potassium chloride containing crude potash salts which consists in treating solutions of the crude potash salts in presence of ammonium salts with gaseous ammonia and separating the precipitated potassium sulfate from the solution obtained.

2. A method for making valuable products from magnesium sulfate and potassium chloride containing crude potash salts which consists in treating solutions of the crude potash salts in presence of ammonium chloride with gaseous ammonia and separating the precipitated potassium sulfate from the solution obtained.

3. A method for making valuable products from magnesium sulfate and potassium chloride containing crude potash salts which consists in treating solutions of the crude potash salts in presence of ammonium salts with gaseous ammonia, separating the precipitated potassium sulfate from the solution obtained, treating the solution with ammonium carbonates and separating the precipitated magnesium compounds from the solution obtained.

4. A method for making valuable products from magnesium sulfate and potassium chloride containing crude potash salts which consists in treating solutions of the crude potash salts in presence of ammonium salts with gaseous ammonia, separating the precipitated potasium sulfate from the solution obtained, treating the solution with ammonia and carbon dioxide and separating the precipitated magnesium compounds from the solution obtained.

5. A method for making valuable products from magnesium sulfate, potassium chloride and sodium chloride containing crude potash salts which consists in treating solutions of the crude potash salts in presence of ammonium salts with gaseous ammonia, separating the precipitated potassium sulfate from the solution obtained, converting the magnesium compounds in the solution into precipitating magnesium carbonates by reaction with ammonium carbonates, separating the magnesium carbonates from the solution and converting the sodium chloride present in the solution into sodium bicarbonate by treatment with ammonia and carbon dioxide.

6. A method for making valuable products from magnesium sulfate, potassium chloride and sodium chloride containing crude potash salts which consists in treating solutions of the crude potash salts in presence of ammonium salts with gaseous ammonia, separating the precipitated potassium sulfate from the solution obtained, converting the magnesium compounds in the solution into precipitating magnesium carbonates by reaction with ammonium carbonates, separating the magnesium carbonates from the solution, converting the sodium chloride present in the solution into sodium bicarbonate by treatment with ammonia and carbon dioxide, separating the sodium bicarbonate from the solution and recovering a fertilizing salt mixture consisting mainly of ammonium chloride and potassium chloride from the solution by crystallization.

7. A method for making valuable products from magnesium sulfate, potassium chloride and sodium chloride containing crude potash salts which consists in treating solutions of the crude potash salts in presence of ammonium chloride with gaseous ammonia, separating the precipitated potassium sulfate from the solution obtained, converting the magnesium compounds in the solution into precipitating magnesium carbonates by reaction with ammonium carbonates, separating the magnesium carbonates from the solution, converting the sodium chloride present in the solution into sodium bicarbonate by treatment with ammonia and carbon dioxide, separating the sodium bicarbonate from the solution and recovering a fertilizing salt mixture consisting mainly of ammonium chloride and potassium chloride from the solution by crystallization.

8. A method according to claim 3 in which the precipitated magnesium carbonates are converted into potassium-magnesium bicarbonate by treatment with carbon dioxide in presence of potassium chloride, the precipitated bicarbonate is separated from the solution and a fertilizing salt mixture consisting mainly of ammonium chloride and potassium chloride is recovered from the solution by crystallization.

9. A method according to claim 6 in which the precipitated magnesium carbonates are converted into potassium-magnesium bicarbonate by treatment with carbon dioxide in presence of potassium chloride, the precipitated bicarbonate is separated from the solution and a fertilizing salt mixture consisting mainly of ammonium chloride and potassium chloride is recovered by crystallizing this solution together with the solution remaining after the separation of the sodium bicarbonate.

10. A method according to claim 3 in which the precipitated magnesium carbonates are converted into potassium-magnesium bicarbonate by treatment with carbon dioxide in presence of potassium chloride, the precipitated bicarbonate is separated from the solution, a salt mixture consisting mainly of ammonium chloride and potassium chloride is recovered from the solution by crystallization and said salt mixture is treated with aqueous ammonia for separating the ammonium chloride from the potassium chloride.

11. A method according to claim 6 in which the precipitated magnesium carbonates are converted into potassium-magnesium bicarbonate by treatment with carbon dioxide in presence of potassium chloride, the precipitated bicarbonate is separated from the solution, a salt mixture consisting mainly of ammonium chloride and potassium chloride is recovered by crystallizing this solution together with the solution remaining after the separation of the sodium bicarbonate and said salt mixture is treated with aqueous ammonia for separating the ammonium chloride from the potassium chloride.

12. A method for making valuable products from magnesium sulfate, potassium chloride and sodium chloride containing crude potash salts which consists in treating solutions of the crude potash salts in presence of ammonium salts with gaseous ammonia, separating the precipitated potassium sulfate from the solution obtained, converting the magnesium compounds in the solution in to precipitating magnesium carbonates by reaction with ammonium carbonates, separating the magnesium carbonates from the solution, converting the sodium chloride present in the solution into sodium bicarbonate by treatment with ammonia and carbon dioxide, separating the sodium bicarbonate from the solution, recovering a fertilizing salt mixture consisting mainly of ammonium chloride and potassium chloride from the solution by crystallization and using the mother liquor from this crystallization for dissolving fresh crude potash salt.

13. A method according to claim 3 in which the precipitated magnesium carbonates are converted into potassium-magnesium bicarbonate by treatment with carbon dioxide in presence of potassium chloride, the precipitated bicarbonate is separated from the solution, a fertilizing salt mixture consisting mainly of ammonium chloride and potassium chloride is recovered from the solution by crystallization and the mother liquor of this crystallization is used for dissolving fresh crude potash salts.

14. A method according to claim 6 in which the precipitated magnesium carbonates are converted into potassium-magnesium bicarbonate by treatment with carbon dioxide in presence of potassium chloride, the precipitated bicarbonate is separated from the solution, a fertilizing salt mixture consisting mainly of ammonium chloride and potassium chloride is recovered by crystallizing this solution together with the solution remaining after the separation of the sodium bicarbonate and the mother liquor from this crystallization is used for dissolving fresh crude potash salt.

In testimony whereof I affix my signature.

FRIEDRICH RÜSBERG.